(12) United States Patent
Ye (10) Patent No.: US 9,691,582 B2
(45) Date of Patent: Jun. 27, 2017

(54) PHOTO-CONTROL RECEPTACLE

(71) Applicant: Qicheng Electrical Equipment Co., Ltd., Wenzhou (CN)

(72) Inventor: Xuanfeng Ye, Wenzhou (CN)

(73) Assignee: Qicheng Electrical Equipment Co., Ltd., Wenzhou (CN)

( * ) Notice: Subject to any disclaimer, the term of this patent is extended or adjusted under 35 U.S.C. 154(b) by 0 days.

(21) Appl. No.: 14/854,341

(22) Filed: Sep. 15, 2015

(65) Prior Publication Data
US 2016/0111813 A1 Apr. 21, 2016

(30) Foreign Application Priority Data
Oct. 20, 2014 (CN) .................... 2014 2 0607161 U (51) Int. Cl.
*H01R 13/62* (2006.01)
*H01J 9/00* (2006.01)
*H01R 4/18* (2006.01)
*H01R 13/11* (2006.01)
*H05B 37/02* (2006.01)

(52) U.S. Cl.
CPC ................ *H01J 9/00* (2013.01); *H01R 4/184* (2013.01); *H01R 13/111* (2013.01); *H05B 37/0218* (2013.01)

(58) Field of Classification Search
USPC ............... 439/107, 685, 337, 689, 673, 674
See application file for complete search history.

(56) References Cited

U.S. PATENT DOCUMENTS

| 3,083,347 A * | 3/1963 | Fahey, Jr. | ............ H01R 24/005 439/337 |
| 3,601,780 A * | 8/1971 | Lyon | .................... H01R 13/567 439/685 |
| 3,614,702 A * | 10/1971 | Vargas | ...................... F16B 5/04 200/284 |
| 2014/0302715 A1 | 10/2014 | Wagner et al. | |

* cited by examiner

*Primary Examiner* — Phuong Dinh
(74) *Attorney, Agent, or Firm* — Osha Liang LLP (57) ABSTRACT

The invention relates to a photo-control receptacle, which comprises a base, having a power jack formed on one side and a pin holding groove formed on the other side thereof and communicated with the power jack; a mounting base, connected with the base through a connecting structure, having a plurality of pin mounting grooves arranged on one end and cable grooves arranged on the other end thereof and communicated with the pin mounting grooves; wherein, each of the pin mounting grooves has a metal pin arranged therein, which is further arranged to extend into the pin holding groove, the cable groove has a cable arranged therein and connected with the metal pin. The photo-control receptacle of the utility model achieves the tool-free installation, the assembly process is simple and saves time and labor. In addition, according to the actual situation, the orientation of the photo-control device can be adjusted by changing the relative position of the base and the mounting base.

12 Claims, 10 Drawing Sheets

PHOTO-CONTROL RECEPTACLE

CROSS-REFERENCE TO RELATED APPLICATIONS

Pursuant to 35 U.S.C. §119 and the Paris Convention Treaty, this application is a national stage application based on Chinese Patent Application No. 201420607161.2 filed on Oct. 20, 2014. This application claims the priority of this prior application and incorporates its disclosures by reference in its entireties.

BACKGROUND OF INVENTION

Field of the Invention

The utility model relates to a photo-control receptacle and belongs to the field of electrical technology.

Description of the Related Art

A photo-control device is a control device used to control light switches by sensing the change of light and widely employed in controlling street and yard lighting. In order to work effectively, it is necessary to consider the corresponding light source or position of the environment when the photo-control device is installed. Mostly, a photo-control receptacle is used to cooperate with and power the photo-control device for safer use. However, a screwdriver and other tools are used to install the existing photo-control receptacles, which leads to a complex assembly process and wastes time and labor.

For embodiment, US patent US2014/0302715A1 discloses a photo-control receptacle provided with an integral structure design. The design is realized by mounting the metal pin into the mounting groove from the rear side of the receptacle and mounting the metal piece from the front side, which to some extent facilitates the assembly process of the photo-control receptacle.

However, after inserting the metal pin, the electrical contact of the photo-control receptacle applies a push force on the metal pin towards outside of the mounting hole because of the rear side mounting, and the metal pin will separate from the mounting position after inserting and removing multiple times, which leads to a poor contact with the electrical contact. In addition, the integral structure design causes a complex forming process of the receptacle body and a high cost of the mold manufacture.

Besides, only one side of the metal piece is arranged with a barb, which can prevent the metal piece from separating from the function jack, but cannot prevent the shaking therein, so that the shift of the metal piece causes a phenomena of poor contact between the electrical contact of the photo control receptacle and the metal piece.

SUMMARY OF INVENTION

One object of the invention is to provide a photo-control receptacle with convenient and stable installation, simple forming process and low cost of the mold manufacture.

Another object of the invention is to provide a photo-control receptacle with a metal piece fixed and not shaking in the function jack.

The photo-control receptacle of the invention comprises a base, having a power jack formed on one side and a pin holding groove formed on the other side thereof and communicated with the power jack; a mounting base, connected with the base through a connecting structure, having a plurality of pin mounting grooves arranged on one end and a cable groove arranged on the other end thereof and communicated with the pin mounting grooves; each of the pin mounting grooves has a metal pin arranged therein, which is further arranged to extend into the pin holding groove, the cable groove has a cable arranged therein and connected with the metal pin electrically.

In a class of the embodiment, the connecting structure comprises a first connecting hole, a second connecting hole and a rivet; the first connecting hole is arranged on the base, the second connecting hole is arranged on the mounting base and communicated with the first connecting hole, and the rivet is arranged to extend through the first connecting hole and the second connecting hole and connect the base and the mounting base.

In a class of the embodiment, the connecting structure also comprises a plurality of first bulges, second bulges and recesses; the first bulge are formed on an edge of the mounting base, the second bulges are formed surrounding the second connecting hole, and the recesses are formed on the base and arranged to coordinate with the first bulges and the second bulges for positioning the mounting base on the base.

In a class of the embodiment, the riveting way of the rivet is flanging riveting.

In a class of the embodiment, a plurality of function jacks are formed on one side of the base, each of the function jacks has a metal piece arranged therein, and the mounting base has a cable through hole arranged thereon, which allows the cable to extend therethrough and into the base to be connected with the metal piece electrically.

In a class of the embodiment, the metal piece further comprises a contact segment, a connecting segment and a fixing segment; the connecting segment and the fixing segment are disposed on opposite sides of the contact segment and inserted into the function jacks respectively, and the contact segment, the connecting segment and the fixing segment form a u-shaped frame structure; the connecting segment and the fixing segment respectively have a fixing structure formed thereon for preventing the metal piece from separating from the function jacks and shaking; and the connecting segment is connected with a cable electrically.

In a class of the embodiment, the fixing structure comprises a barb, a top hook, a convex part and a concave part; the barb is formed on a side wall of the connecting segment with which the barb has a certain angle; the top hook is fanned on a side wall of the fixing segment; the convex part is formed in an orifice of the first function jack which receives the connecting segment to make the width of the orifice less than the inner width of the first function jack and to block the barb; the concave part is formed on the wall of the second function jack receiving the fixing segment and adapted for receiving the top hook.

In a class of the embodiment, the top hook comprises a connecting plate and a folding plate; the connecting plate is connected with the side wall of the fixing segment by an anglect; the folding plate is connected with the connecting plate by an angleβ, extending towards the fixing segment; the convex part is arranged to abut against the top of the barb; and a connecting part of the folding plate and the concave part coordinates with the concave part to fix the metal piece in the function jack.

In a class of the embodiment, the photo-control receptacle comprises two barbs which are arranged on the side wall of the connecting plate collinearly.

In a class of the embodiment, the angle α is 25-60° and the angle β is 100-160°.

In a class of the embodiment, a circular slot and a grab ring assembly are formed on the side wall of the mounting base, and the flexible grab ring assembly comprises a grab ring, a plurality of clasps disposed on one side of the grab ring close to the mounting base and a plurality of grabbing pieces disposed on the grab ring, arranged in the circular slot and grabbing therein, so as to fix the flexible grab ring assembly in the circular slot.

In a class of the embodiment, the clasp is provided with an arm with one end being pendent, and a contact surface formed on the top of the pendent end.

Compared with the prior art, the invention has the following beneficial effects:

(1) The photo-control receptacle of the invention is divided into two relatively independent structures by adopting connecting structure to connect the base and the mounting base formed separately, so as to simplify the forming process and reduce the cost of the mold manufacture. The assembly process of the photo-control receptacle of an embodiment, which comprises inserting the cable into the cable groove and arranged to extend the cable into the pin holding groove; then mounting the metal pin into the pin mounting groove from the opening thereof to connect the cable; next, mounting the base to the mounting base, at the moment the pin holding groove should aim the pin mounting groove to make sure the metal pin can extend into the pin holding groove; finally, fixing the base with the mounting base by connecting structure. The whole assembly process is simple and saving time and labor by arranging the pin mounting groove and the pin holding groove to limit the shift of the metal pin, prevent the photo-control device from leaving the mounting position after inserting and removing multiple times and ensure the connection of the electrical contact and the metal pin.

(2) The photo-control receptacle of the invention may provide a firm connection between the base and the mounting base by riveting the base and the mounting base together, which may avoid of the risk brought due to the loose base.

(3) The photo-control receptacle of the invention, by positioning the first bulges, the second bulges and the recesses, on one hand, it is convenient for the installers to align the base and mounting base, on the other hand, it is adapted for improving the connection stability thereof.

(4) The photo-control receptacle of the invention, the rivet is fixed by the flanging riveting which keeps the rivet from loosening and further improves the connection stability of the base and the mounting base.

(5) In the photo-control receptacle of the invention, the metal piece is fixed in the function jack by arranging a fixing structure, so that the metal piece is prevented from separating from the function jack and shaking therein so as to keep the stable contact between the metal piece and the electrical contact of the photo-control device and enhance the safety of the photo-control device and the photo-control receptacle.

(6) In the photo-control receptacle of the invention, after metal piece is arranged in the function jack from upper surface of the base, the barb cannot separate from the function jack because of the block of the bulge, and the connecting plate and the connecting part of the folding plate coordinate with the recesses to apply a lateral force to the metal piece so as to fix the metal piece in the function jack and prevent the shaking therein, keep the stable contact between the metal piece and the electrical contact of the photo-control device and enhance the safety of the photo-control device and the photo-control receptacle.

(7) In the photo-control receptacle of the invention, a circular connecting segment is arranged to increase the contact area of the metal piece with the electrical contact of the photo-control device so that the metal piece can keep the electric connection with the electrical contact of the photo-control device even if the photo-control device rotates at an angle relative to the photo-control receptacle.

(8) In the photo-control receptacle of the invention, a grab ring assembly is arranged and when installing, the contact surface contacts with the housing of the lamp to press the elastic arms of the clasps. The photo-control receptacle can be fixed in the housing of the lamp by the pushing force of the elastic arm and the elastic force applied by the grabbing pieces of the grab ring assembly grabbing the mounting base, due to the fact that the housing of the lamp is fixed, so as to achieve the tool-free installation, i.e. installation without use of tools. In addition, the fixing connection of the photo-control receptacle with the housing adopts the tool-free installation using the grab ring assembly and the grabbing pieces but not the screw or other tools so that the photo-control receptacle can rotate relative to the housing. By holding the base, a rotating force is applied along the opposite direction of the extension direction of the clasps so as to achieve the rotation of photo-control receptacle together with the photo-control device. The operation is very convenient and avoids the problem that the photo-control device cannot rotate to sense the light.

BRIEF DESCRIPTION OF THE DRAWINGS

To make an easier understanding of the utility model, the utility model is further described in the following embodiments with reference to the drawings.

The appended drawing reference signs show: 1—base, 11—power jack, 12—first connecting hole, 13—function jack, 13a—first function jack, 13b—second function jack, 131—convex part, 132—concave part, 14—pin holding groove, 15a, 15b—recesses, 2—mounting base, 21—second connecting hole, 22—pin mounting groove, 23—cable groove, 24a—first bulges, 24b—second bulges, 25—cable through hole, 26—circular slot, 3—metal pin, 4—metal piece, 41—contact segment, 42—connecting segment, 421—barb, 43—fixing segment, 431—top hook, 431a—connecting plate, 431b—folding plate, 5—rivet, 6—grab ring assembly, 60—grab ring, 61—grabbing pieces, 62—clasps, 621—contact surface, 622—arm.

DETAILED DESCRIPTION OF THE INVENTION

A detailed description of a photo-control receptacle of the utility model is shown as follow:

Embodiment 1

One embodiment of a photo-control receptacle is illustrated in FIG. 1-5 and comprises a base 1, having a power jack 11 formed on one side and a pin holding groove 14 formed on the other side thereof and communicated with the power jack 11; a mounting base 2, connected with the base 1 through a connecting structure, having a plurality of pin mounting grooves 22 arranged on one end and a cable groove 23 arranged on the other end thereof and communicated with the pin mounting grooves 22; wherein, each of the pin mounting grooves 14 has a metal pin 3 arranged therein, which is further arranged to extend into the pin holding groove 14, the cable groove 23 has a cable arranged therein and connected with the metal pin 3.

The photo-control receptacle embodiment is divided into two relatively independent structures by connecting the base 1 and the mounting base 2 formed separately with a connecting structure, so as to simplify the forming process and reduce the cost of the mold manufacture. The assembly process of the photo-control receptacle of the embodiment, comprises the steps of inserting the cable into the cable groove 23 and arranged to extend the cable into the pin holding groove 14; mounting the metal pin 3 into the pin mounting groove 22 from the opening thereof to connect the cable; mounting the base 1 to the mounting base 2, and keeping the pin holding groove 14 being aligned with the pin mounting groove 22 to make sure the metal pin 3 can extend into the pin holding groove 14; finally, fixing the base 1 with the mounting base 2 by a connecting structure. The whole assembly process is simple and saving time and labor by arranging the pin mounting groove 22 and the pin holding groove 14 to limit the shift of the metal pin 3, prevent the photo-control device from leaving the mounting position and ensure the connection of the electrical contact and the metal pin 3.

The photo-control receptacle of embodiment 1, the connecting structure comprises a first connecting hole 12, a second connecting hole 21 and a rivet 5; the first connecting hole 12 is arranged on the base 1, the second connecting hole 21 is arranged on the mounting base 2 and communicated with the first connecting hole 12. The first connecting hole 12 or the second connecting hole 21 is positioned in the central area of the base 1 or the mounting base 2 generally, and the aperture of the first connecting hole 12 is larger than the one of second connecting hole 21 so as to facilitate the mounting of the rivet 5.

Riveting the base 1 and the mounting base 2 together by the rivet 5 can achieve a firm connection between the base and the mounting base and avoid of the security risk due to the loose base.

A snap structure, screw or bolt formed on the base and the mounting base can be used as a transformation of the connecting structure.

In the present embodiment, embodiment, the connecting structure also comprises a plurality of first bulges 24a, second bulges 24b and recesses 15a, 15b; the first bulges 24a are formed on an edge of the mounting base 2, the second bulges 24b are formed surrounding the second connecting hole 21, and the recesses 15a, 15b are formed on the base 1 and arranged to coordinate with the first bulges 24a and the second bulges 24b for positioning the base 1 and the mounting base 2.

By positioning the first bulges, the second bulges in the recesses, it is convenient for the installers to align the base and mounting base on one hand; the connection stability thereof can be enhanced on the other hand.

The photo-control receptacle of embodiment 1, wherein, the riveting way of the rivet is flanging riveting.

The rivet is fixed by the flanging riveting which keeps the rivet from loosening, the connection stability of the base with the mounting base has been further improved.

Figure 5:
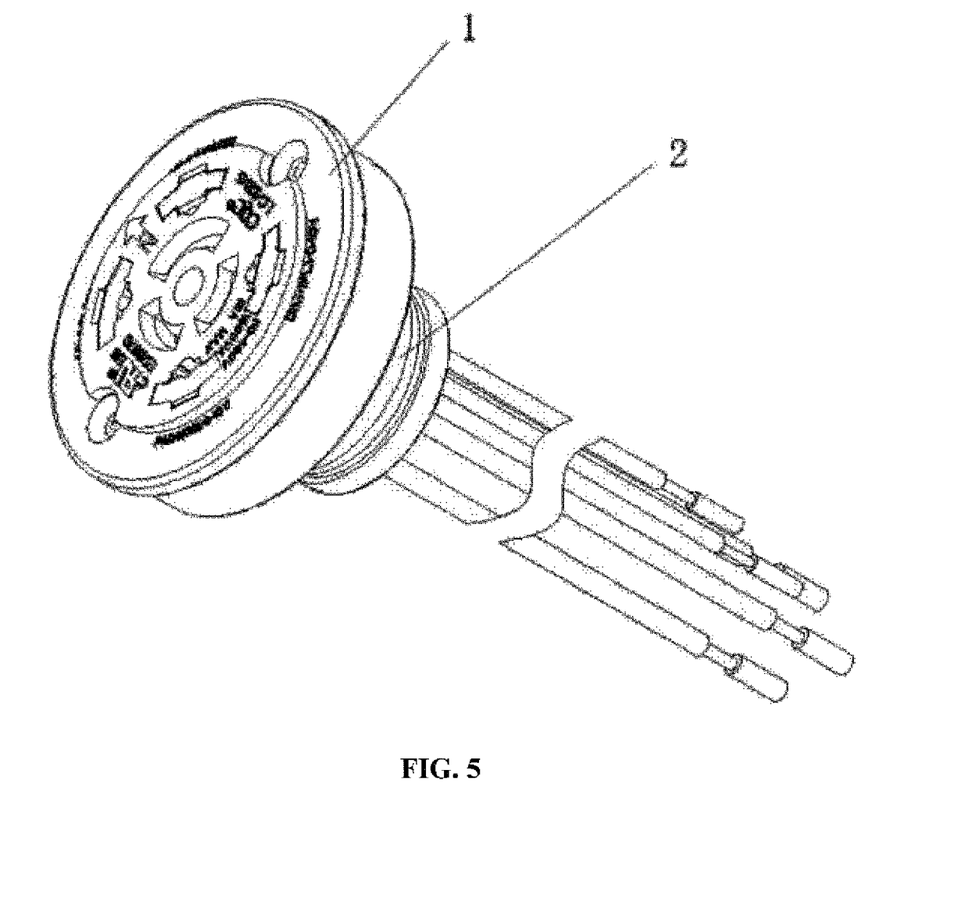
FIG. 5 is a space diagram of the photo-control receptacle of embodiment 1 of the invention.

The photo-control receptacle of embodiment 1, a circular slot 26 with trapezoid cross section is formed on the mounting base 2 and the larger opening end thereof is arranged towards outside, the mounting base 2 can be arranged on any mounting elements having the corresponding bulge.

Embodiment 2

Figure 1:
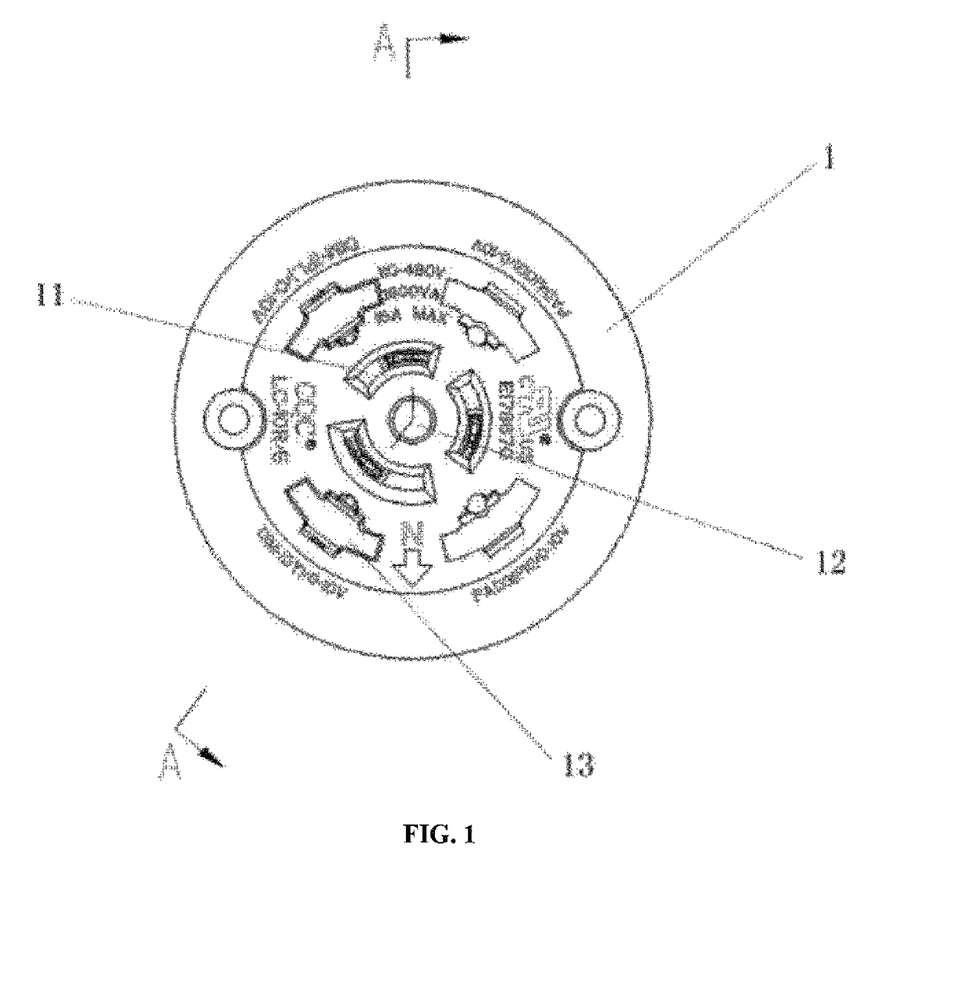
FIG. 1 is a front view of the photo-control receptacle of embodiment 1 of the invention.
Figure 2:
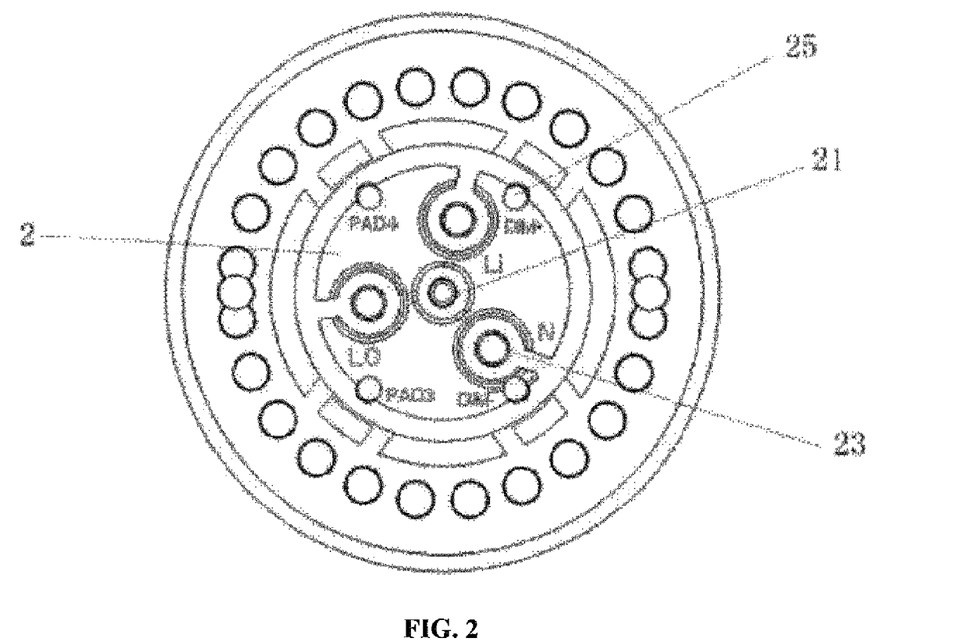
FIG. 2 is a rear view of the photo-control receptacle of embodiment 1 of the invention.
Figure 3:
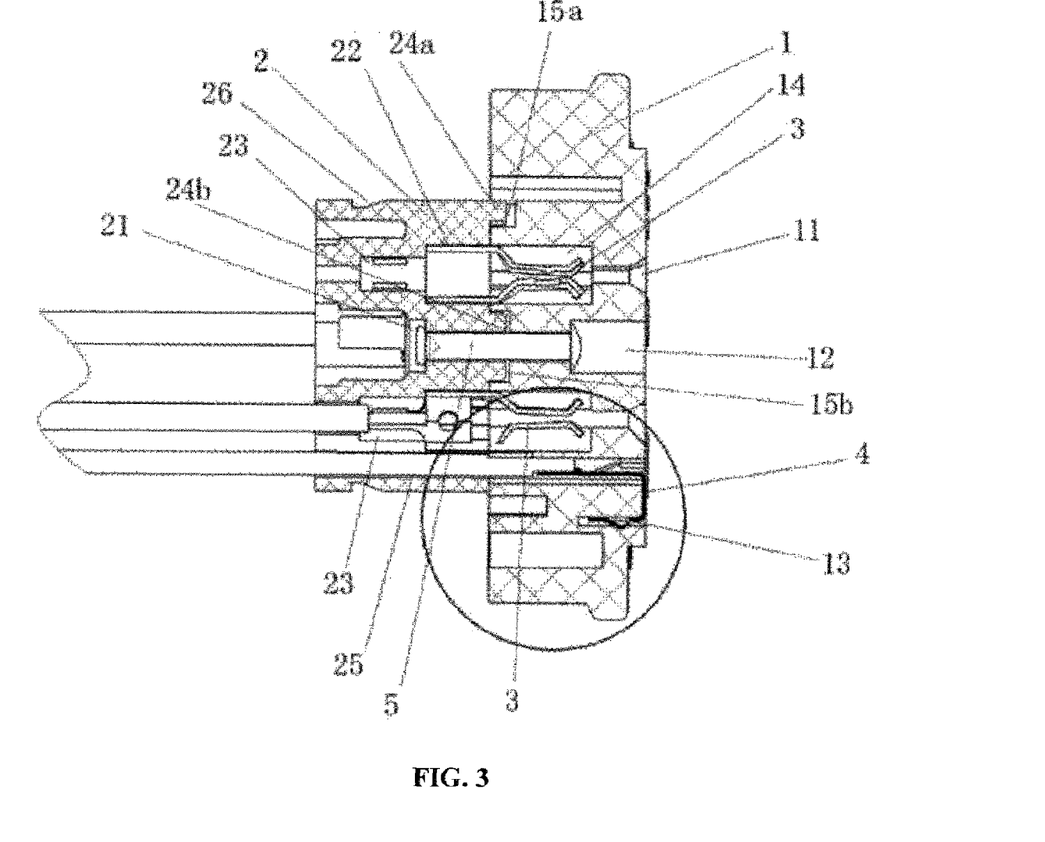
FIG. 3 is a sectional perspective view of the photo-control receptacle of FIG. 1 along the direction A-A.

A photo-control receptacle provided in embodiment 2 has further improvement on the embodiment 1, the differences therebetween are that a plurality of function jacks 13 are formed on one side of the base 1, each of the function jacks has a metal piece 4 arranged therein as shown in FIG. 1, and the mounting base 2 has a plurality of cable through holes 25 arranged thereon, which allows cables to extend therethrough and be inserted into the base 1 to connect with the metal pieces (4) electrically as shown in FIG. 2.

Special needs to be pointed out that not all of the function jacks 13 are arranged with metal pieces 4, one or more metal pieces 4 can be arranged into the function jacks 13 as needed, for example, four function jacks are shown in FIG. 1, two of which have two metal pieces 4 arranged therein while the other two do not have, or all the four function jacks 13 have a metal piece arranged therein.

Figure 6:
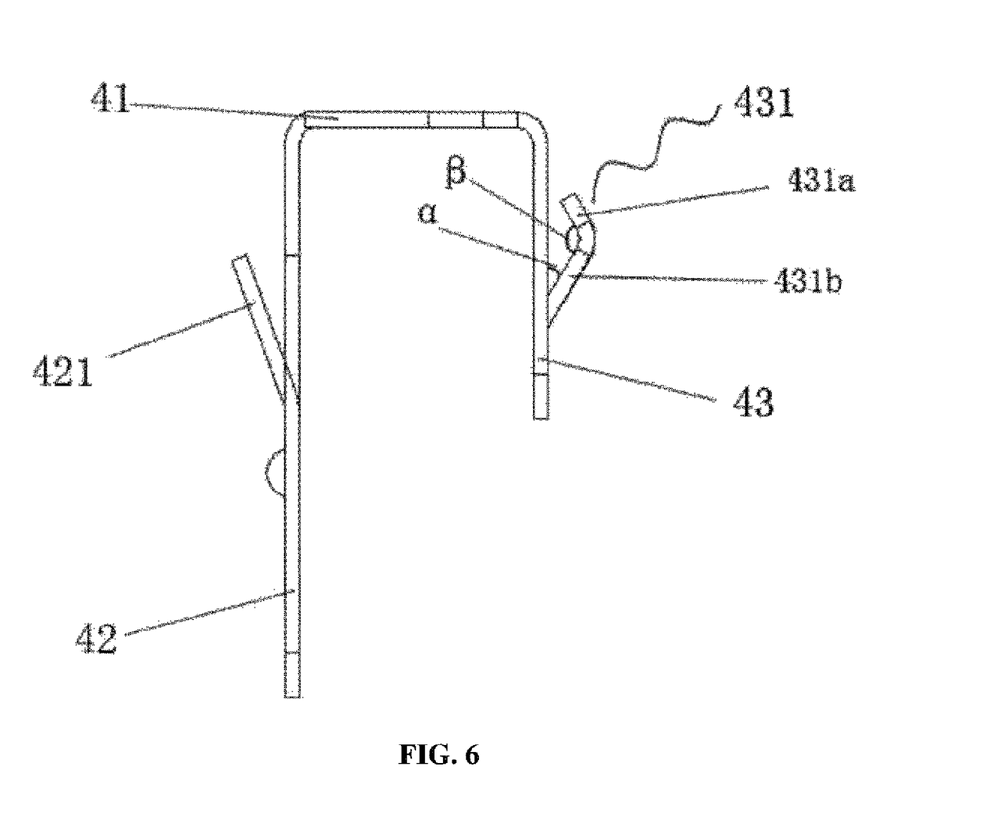
FIG. 6 is a front view of the metal piece of embodiment 2 of the invention.
Figure 7:
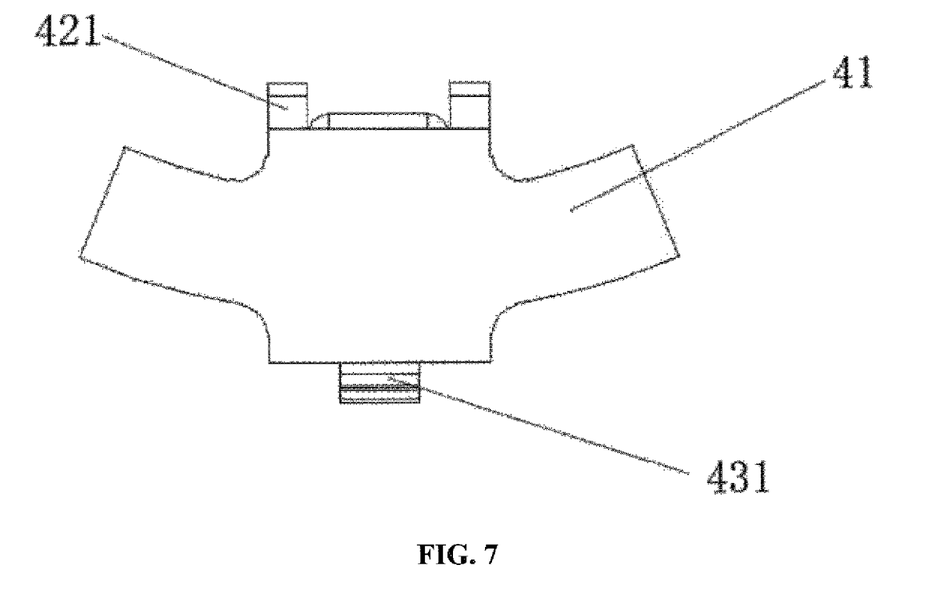
FIG. 7 is a top view of the metal piece of embodiment 2 of the invention.

The photo-control receptacle of embodiment 2 as shown in FIGS. 6 and 7, the metal piece 4 further comprises a contact segment 41, a connecting segment 42 and a fixing segment 43; the connecting segment 42 and the fixing segment 43 having a fixing structure formed thereon for preventing the metal piece 4 from separating from the function jacks 13 and shaking are disposed on opposite sides of the contact segment 41 and inserted into the function jacks 13 respectively. The contact segment 41, the connecting segment 42 and the fixing segment 43 form a u-shaped frame structure, and the connecting segment 42 is connected with a cable electrically wherein the length of the connection segment 42 is greater than that of the fixing segment 43.

The metal piece 4 can be fixed in the function jack 13 by arranging a fixing structure which prevents the metal piece 4 from separating from the function jack 13 and shaking therein so as to keep the stable contact between the metal piece 4 and the electrical contact of the photo-control device and enhance the safety of the photo-control device and the photo-control receptacle.

In the photo-control receptacle of embodiment 2, the fixing structure comprises a barb 421, a top hook 431, a convex part 131 and a concave part 132; the barb 421 is formed on a side wall of the connecting segment 42 with which the barb 421 has a certain angle; the top hook 131 is formed on a side wall of the fixing segment 43; the convex part 131 is formed in the orifice of the first function jack 13a which receives the connecting segment 42 to make the width of the orifice less than the inner width of the first function jack 13a and to block the barb 421; the concave part 132 is formed on the wall of the second function jack 13b receiving the fixing segment 43 and adapted for receiving the top hook 431.

Figure 4:
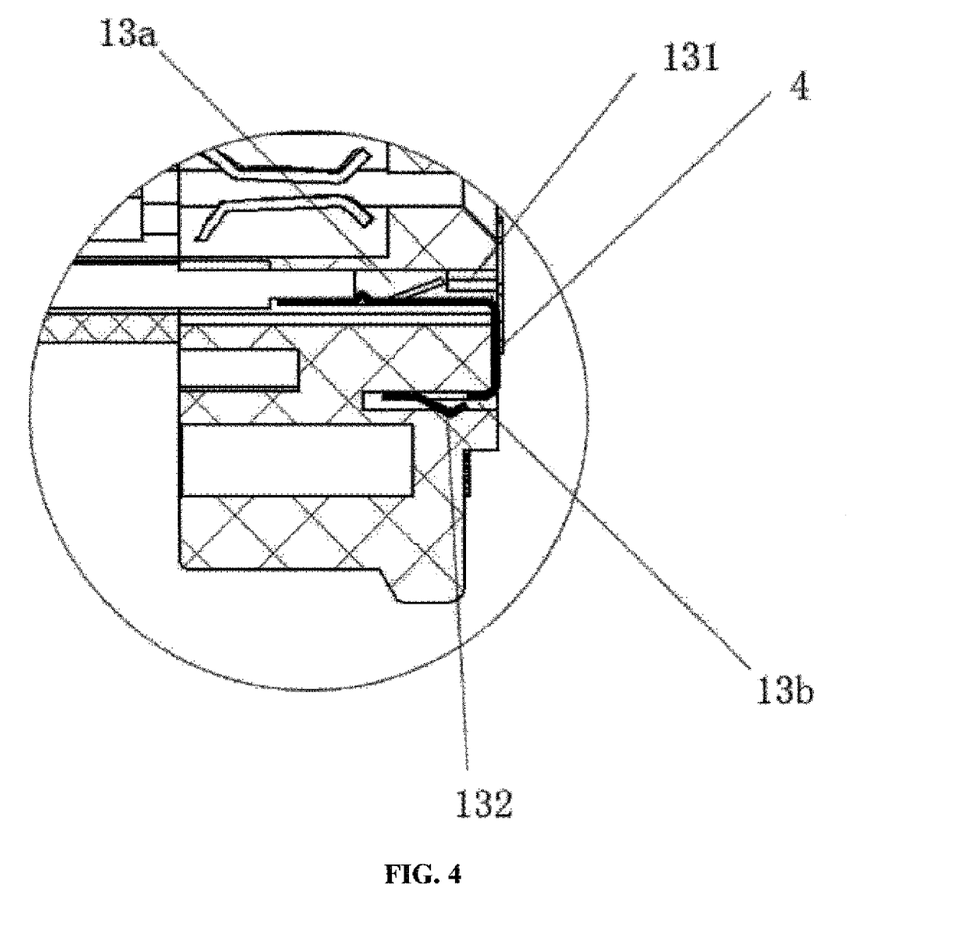
FIG. 4 is an enlarged perspective view of the circled area of FIG. 3.

The connecting segment 42 and the fixing segment 43 are mounted into the first function jack 13a and the section function jack 13b separately. the convex part 131 and the concave part 132 are adapted for limiting the position, which allows when the metal piece 421 has motion trend towards the left or upper or lower of FIG. 4, one part of the base 1 surrounded by the u-shaped frame blocks the contact segment 41 or the fixing segment 43 or the connecting segment 42 of the metal piece 4 to stop the leftward or upward or downward motion, the trend of rightward motion of the metal piece 4 is stopped by the convex part 131, so that the metal piece cannot have the upward, downward, leftward and rightward motion, cannot separate from the base or shake therein, and is limited in the position securely and stably.

The photo-control receptacle of embodiment 2, the barb 421 has an acute angle of 25° with the connecting segment 42, and the angle can be changed based on the aperture of the first function jack 13a and the height of the convex part 131, or conversely, the height of the convex part 131 can be changed based on the angle between the barb 421 and the connecting segment 42. For example, when the height of the convex part 121 is decreased (i.e. the thickness of the convex part 121 is decreased along the upper side shown as FIG. 3), the acute angle can be increased to 30°, 35°, 40°, etc.; when the height of the convex part 131 is increased (i.e. the thickness of the convex part 131 is increased along the lower side shown as FIG. 3), the acute angle can be decreased to 15°, 16°, 17°, etc., so as to make sure that the convex part 131 can block the barb 421 in the first function jack 13a.

In the photo-control receptacle of embodiment 2, the top hook 431 comprises a connecting plate 431b and a folding plate 431b; the connecting plate 431a is connected with the side wall of the fixing segment 43 by an angle α; the folding plate 431b is connected with the connecting plate 431a by an angle β and arranged to extend towards the fixing segment 43; the convex part 131 is arranged to abut against the top of the barb 421; and a connecting part of the folding plate 431b and the concave part 132 coordinates with the concave part 132 to fix the metal piece 4 in the function jack 13.

In the photo-control receptacle of embodiment 2, the assembly process of the photo-control receptacle, comprises the steps of inserting the cable into the cable groove 23 and arranged to extend the cable into the pin holding groove 14 and the cable through hole 25, mounting the metal pin 3 into the pin mounting groove 22 from the opening thereof to connect to the cable, mounting the base 1 to the mounting base 2 and meanwhile aligning the pin holding groove 14 and the pin mounting groove 22 to make sure the metal pin 3 can extend into the pin holding groove 14 and aligning the function jack 13 and the cable through hole 25 to make sure the cable can be inserted into the function jack 13, fixing the base 1 with the mounting base 2 by connecting structure, and mounting the metal piece 4 into the function jack 13 from the upper side of the base 1 to connect the metal piece 4 with the cable. The barb 421 cannot separate from the function jack 13 because of the block of the bulges after metal piece 4 is arranged in the function jack 13 from upper surface of the base 1, and the connecting plate 431a and the connecting part of the folding plate 431b coordinate with the recesses 15a, 15b to apply a lateral force to the metal piece 4 so as to fix the metal piece 4 in the function jack 13, so as to prevent the shaking therein, keep the stable contact between the metal piece 4 and the electrical contact of the photo-control device and enhance the safety of the photo-control device and the photo-control receptacle.

In the photo-control receptacle of embodiment 2, the connecting segment 42 is circular, the connecting segment 42 and the fixing segment 43 are arranged on the two radial sides of the contact segment 41 separately.

A circular connecting segment 42 is arranged to enlarge the contact area of the metal piece 4 with the electrical contact of the photo-control device so that the metal piece 4 can keep the electric connection with the electrical contact of the photo-control device even if the photo-control device rotates at an angle relative to the photo-control receptacle.

The photo-control receptacle of embodiment 2 comprises two barbs 421 which are arranged on the side wall of the connecting plate 431a collinearly.

The photo-control receptacle of embodiment 2, as a preferred embodiment, the angle α is 30° and the angle β is 120°, the angle α and the angle β also could be other angles, for embodiment, α can be 25°, 45°, 60°, etc. and β can be 100°, 140°, 160°, etc.

Embodiment 3

Figure 8:
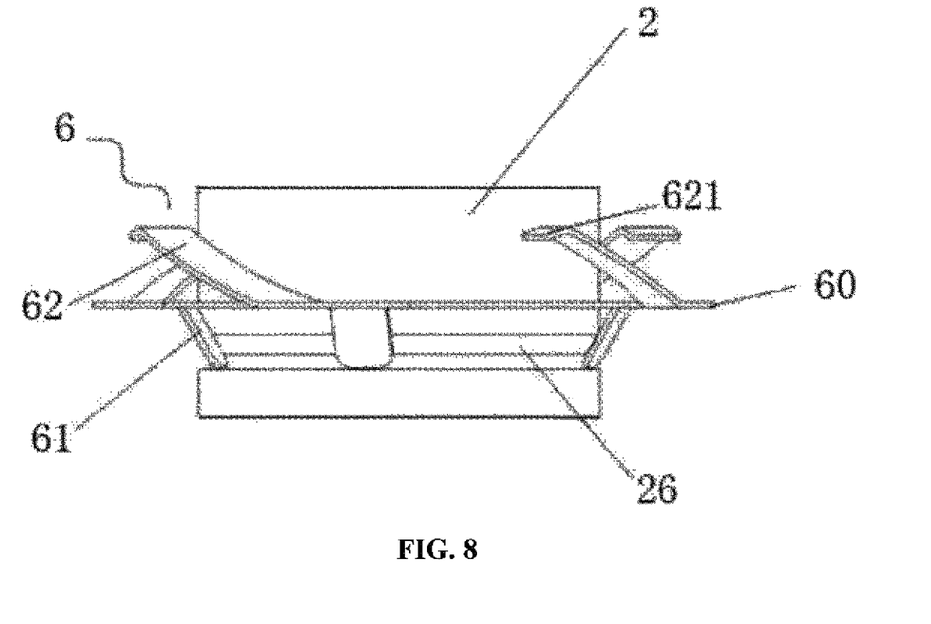
FIG. 8 is an installation view of the circular card slot of embodiment 3 of the invention.
Figure 9:
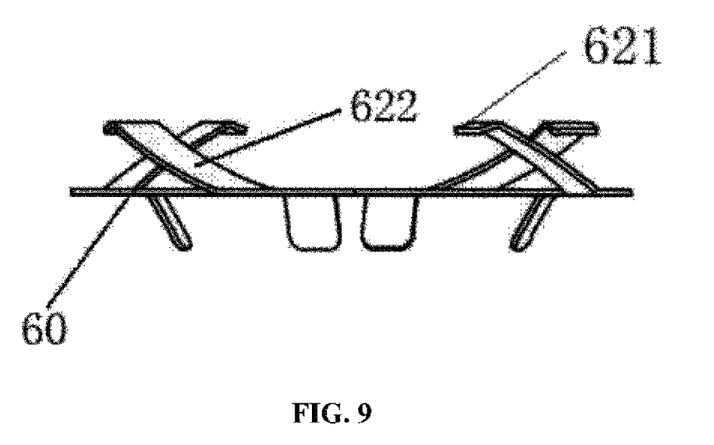
FIG. 9 is a side view of the circular card slot of embodiment 3 of the invention.
Figure 10:
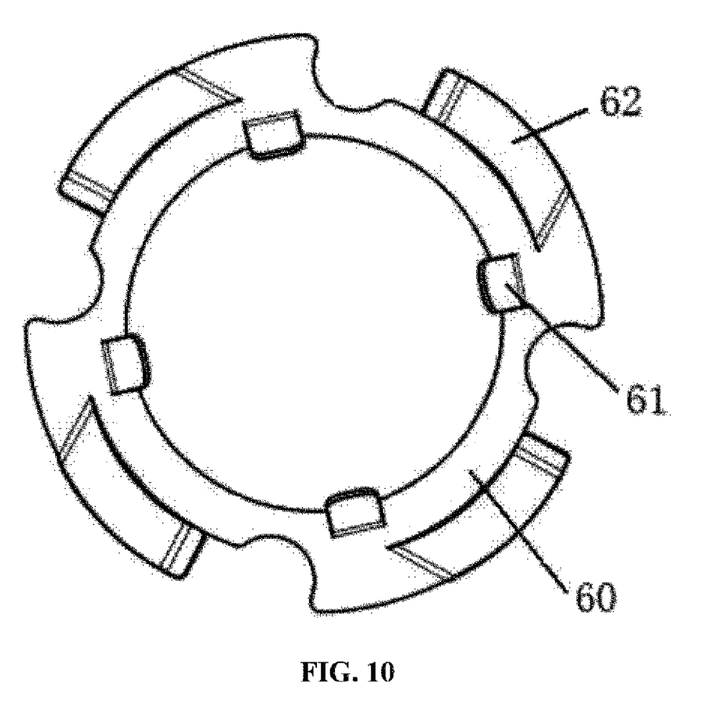
FIG. 10 is a front view of the circular card slot of embodiment 3 of the invention.

The photo-control receptacle of embodiment 3 is an improvement of embodiment 1 or 2, the differences with embodiment 1 or 2 are: a circular slot 26 and a grab ring assembly 6 are formed on the side wall of the mounting base 2, and the elastic grab ring assembly 6 comprises a grab ring 60, a plurality of clasps 62 disposed on one side of the grab ring close to the mounting base 2 and a plurality of grabbing pieces 61 disposed on the grab ring 60, arranged in the circular slot 26 and grabbing therein, so as to fix the elastic grab ring assembly 6 in the circular slot 26.

In particular, a plurality of grabbing pieces 61 can be arranged on the two sides of the grab ring 60 or only one side thereof, but making sure the grab ring assembly 6 cannot move with the elastic force applied by the clasps 62.

The photo-control receptacle of embodiment 3, each clasp 62 is provided with an arm 622 with one end being pendent, and a contact surface formed on the top of the pendent end. Preferably, the clasps 62 comprises four arms 622 arranged on the same side of the grabbing ring 60 and extended along the same direction (the upper of FIG. 9), and every two arms 622 cross each other so as to enable grabbing ring assembly 6 to rotate in a unidirectional manner along the opposite direction of the clasps' extension direction (the direction from left to right in FIG. 8). Each of the arms 622 arranged with a contact surface 621 arranged on the top of the pendent end thereof is connected with the grabbing ring 60 via a slope. When installing, by pressing the arms 622 of the clasps 62 via the contact of the contact surface 621 with lamp's housing which is fixed, the photo-control receptacle can be fixed in the lamp's housing and achieves the tool-free installation with no screw or other tools via the push force applied by the arms 622 and the elastic force applied by the grabbing pieces 61 of the grab ring assembly 6 grabbing the mounting base.

Besides, the fixing connection of the photo-control receptacle with the lamp's housing adopts the tool-free installation using the grab ring assembly 6 and the grabbing pieces 61 but not the screw or other tools so that the photo-control receptacle can have relative rotation relative to the lamp's housing. By holding the base 1, a rotating force is applied along the opposite direction of the clasps' extension direction so as to achieve the rotation of photo-control receptacle together with the photo-control device. The operation is very convenience and avoids the problem that the photo-control device cannot rotate to sense the light.

Obviously, the embodiments described above are just for clear illustration but not limiting the manners of implementation. For persons having ordinary skill in the art, different kinds of changes could be made based on the teachings provided above, it's not necessary to shown all the manners of implementation herein, but the obvious extended changes are still in the protection scope of the invention.

The invention claimed is:

1. A photo-control receptacle, comprising:
   a base, having a power jack formed on one side and a pin holding groove formed on the other side thereof and communicated with the power jack;
   a mounting base, connected with the base through a connecting structure, having a plurality of pin mounting grooves arranged on one end and cable grooves arranged on the other end thereof and communicated with the pin mounting grooves;
   wherein,
   each of the pin mounting grooves has a metal pin arranged therein, which is further arranged to extend into the pin holding groove,
   the cable groove has a cable arranged therein and connected with the metal pin,
   the connecting structure comprises a first connecting hole, a second connecting hole and a rivet; the first connecting hole is arranged on the base, the second connecting hole is arranged on the mounting base and communicated with the first connecting hole, and the rivet is arranged to extend through the first connecting hole and the second connecting hole and connect the base and the mounting base, and
   the connection structure also comprises a plurality of first bulges, second bulges and recesses; the first bulges are formed on an edge of the mounting base, the second bulges are formed surrounding the second connecting hole, and the recesses are formed on the base and arranged to coordinate with the first bulges and the second bulges for positioning the base and the mounting base.

2. The photo-control receptacle of claim 1, wherein, the riveting way of the rivet is flanging riveting.

3. The photo-control receptacle of claim 1, a plurality of function jacks are formed on one side of the base, each of the function jacks has a metal piece arranged therein, and the mounting base has a cable through hole arranged thereon, which allows the cable to extend therethrough and into the base to be connected with the metal piece electrically.

4. The photo-control receptacle of claim 3, wherein, the metal piece further comprises a contact segment, a connecting segment and a fixing segment; the connecting segment and the fixing segment are disposed on opposite sides of the contact segment and inserted into the function jacks respectively, and the contact segment, the connecting segment and the fixing segment form a u-shaped frame structure; the connecting segment and the fixing segment respectively have a fixing structure formed thereon, for preventing the metal piece from being separate from the function jacks and shaking; and the connecting segment is connected with a cable electrically.

5. The photo-control receptacle of claim 4, wherein, the fixing structure comprises a barb, a top hook, a convex part and a concave part; the barb is formed on a side wall of the connecting segment with which the barb has a certain angle; the top hook is formed on a side wall of the fixing segment; the convex part is formed in an orifice of the first function jack which receives the connecting segment to make the width of the orifice less than the inner width of the first function jack and to block the barb; the concave part is formed on the wall of the second function jack receiving the fixing segment and adapted for receiving the top hook.

6. The photo-control receptacle of claim 5, wherein, the top hook comprises a connecting plate and a folding plate; the connecting plate is connected with the side wall of the fixing segment by an angle $\alpha$; the folding plate is connected with the connecting plate by an angle $\beta$, extending towards the fixing segment; the convex part is arranged to abut against the top of the barb; and a connecting part of the folding plate and the concave part coordinates with the concave part to fix the metal piece in the function jack.

7. The photo-control receptacle of the claim 6, comprising two barbs which are arranged on the side wall of the connecting plate collinearly.

8. The photo-control receptacle of claim 6, wherein, the angle $\alpha$ is 25-60° and the angle $\beta$ is 100-160°.

9. The photo-control receptacle of claim 1, wherein, a circular slot and a grab ring assembly are formed on the side wall of the mounting base, and the flexible grab ring assembly comprises a grab ring, a plurality of clasps disposed on one side of the grab ring close to the mounting base and a plurality of grabbing pieces disposed on the grab ring, arranged in the circular slot and grabbing therein, so as to fix the flexible grab ring assembly in the circular slot.

10. The photo-control of claim 9, wherein, the clasp is provided with an arm with one end being pendent, and a contact surface formed on the top of the pendent end.

11. The photo-control receptacle of claim 7, wherein, the angle $\alpha$ is 25-60° and the angle $\beta$ is 100-160°.

12. The photo-control receptacle of claim 4 wherein, a circular slot and a grab ring assembly are formed on the side wall of the mounting base, and the flexible grab ring assembly comprises a grab ring, a plurality of clasps disposed on one side of the grab ring close to the mounting base and a plurality of grabbing pieces disposed on the grab ring, arranged in the circular slot and grabbing therein, so as to fix the flexible grab ring assembly in the circular slot.

* * * * *